United States Patent
Nakamura et al.

(10) Patent No.: US 11,087,745 B2
(45) Date of Patent: Aug. 10, 2021

(54) SPEECH RECOGNITION RESULTS RE-RANKING DEVICE, SPEECH RECOGNITION RESULTS RE-RANKING METHOD, AND PROGRAM

(71) Applicant: NIPPON TELEGRAPH AND TELEPHONE CORPORATION, Chiyoda-ku (JP)

(72) Inventors: Takashi Nakamura, Yokosuka (JP); Nobuaki Hiroshima, Yokosuka (JP); Setsuo Yamada, Yokosuka (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 198 days.

(21) Appl. No.: 16/469,360

(22) PCT Filed: Dec. 19, 2017

(86) PCT No.: PCT/JP2017/045500
§ 371 (c)(1),
(2) Date: Jun. 13, 2019

(87) PCT Pub. No.: WO2018/117094
PCT Pub. Date: Jun. 28, 2018

(65) Prior Publication Data
US 2020/0020321 A1   Jan. 16, 2020

(30) Foreign Application Priority Data
Dec. 20, 2016   (JP) .............................. JP2016-246191

(51) Int. Cl.
*G10L 15/18*   (2013.01)
*G06F 15/16*   (2006.01)
(Continued)

(52) U.S. Cl.
CPC ............ *G10L 15/10* (2013.01); *G06F 40/242* (2020.01); *G06F 40/268* (2020.01); *G10L 15/18* (2013.01)

(58) Field of Classification Search
CPC combination set(s) only.
See application file for complete search history.

(56) References Cited

U.S. PATENT DOCUMENTS 8,682,660 B1 * 3/2014 Lyudovyk ............. G10L 15/197
   704/231
2007/0162281 A1 * 7/2007 Saitoh ................... G10L 15/197
   704/251

(Continued)

OTHER PUBLICATIONS

International Search Report dated Feb. 27, 2018 in PCT/JP2017/045500 filed on Dec. 19, 2017.

(Continued)

*Primary Examiner* — Seong-Ah A Shin
(74) *Attorney, Agent, or Firm* — Oblon, McClelland, Maier & Neustadt, L.L.P.

(57) ABSTRACT

To provide a speech recognition results re-ranking technology for re-ranking speech recognition results so as to render speech recognition results suitable for intended use of speech recognition while reducing preparation costs required prior to execution of re-ranking processing of speech recognition results. A speech recognition results re-ranking device includes: a speech recognition unit 210 that generates a speech recognition result set with recognition score from speech data; and a re-ranking unit 220 that generates a speech recognition result set with integrated score from the speech recognition result set with recognition score by using a word vector expression database, a cluster center vector expression database, and a normalized knowledge information word DF value database.

7 Claims, 11 Drawing Sheets

(51) Int. Cl.
  *G10L 15/10* (2006.01)
  *G06F 40/268* (2020.01)
  *G06F 40/242* (2020.01)

(56) References Cited

U.S. PATENT DOCUMENTS

| | | | | |
|---|---|---|---|---|
| 2010/0250241 | A1* | 9/2010 | Iwahashi | G10L 15/22 704/10 |
| 2011/0137921 | A1* | 6/2011 | Inagaki | G06F 16/3347 707/749 |
| 2011/0295857 | A1* | 12/2011 | Aw | G06F 40/45 707/739 |
| 2012/0254310 | A1* | 10/2012 | Kamimaeda | G06F 16/437 709/204 |
| 2015/0297106 | A1* | 10/2015 | Pasley | A61B 5/316 600/378 |
| 2017/0103061 | A1* | 4/2017 | Kobayashi | G06F 40/268 |
| 2017/0287474 | A1* | 10/2017 | Maergner | G06F 40/211 |

OTHER PUBLICATIONS

Oba, T. "Discriminative Language Models—Introduction and Future Prospect-," IPSJ SIG Technical Report, 2008-SLP-72, 2008, pp. 47-50 (with English Abstract).

Mikolov, T. et al., "Distributed Representations of Words and Phrases and their Compositionality," Cornell University Library, arXiv:1310.4546[cs.CL], 2013, https://arxiv.org/pdf/1310.4546v1.pdf, pp. 1-9.

Socher, R. et al., "Parsing Natural Scenes and Natural Language with Recursive Neural Networks," ICML2011, 2011, pp. 129-136, 8 total pages.

* cited by examiner

SPEECH RECOGNITION RESULTS RE-RANKING DEVICE, SPEECH RECOGNITION RESULTS RE-RANKING METHOD, AND PROGRAM

TECHNICAL FIELD

The present invention relates to a speech recognition technology and especially relates to a technology for obtaining a speech recognition result suitable for intended use by re-ranking a plurality of candidates of speech recognition results.

BACKGROUND ART

In the speech recognition technology, re-ranking is sometimes performed so as to rearrange a plurality of speech recognition results in an appropriate order. As the technology related to re-ranking of speech recognition results, some methods have been proposed such as a method using a discriminative language model (Non-patent Literature 1) and a method using a topic model such as latent dirichlet allocation (LDA).

Among these, the method using a discriminative language model is a method in which re-ranking is performed based on a model, which is obtained by learning consistency between a candidate of a speech recognition result and a correct sentence by using a language feature amount, by using a word lattice, a confusion network, and a hypothesis of N-best, which are obtained as a result of execution of speech recognition processing, as inputs.

PRIOR ART LITERATURE

Non-Patent Literature

Non-patent Literature 1: Takanobu Oba, "Discriminative Language Models—Introduction and Future Prospect —", IPSJ SIG Technical Report, 2008-SLP-72, pp. 47-50, 2008.

SUMMARY OF THE INVENTION

Problems to be Solved by the Invention

However, the method using a discriminative language model requires creation of correct sentences through transcription of a speech content of speech data in model learning, requiring much labor. Further, model parameters are generally increased and accordingly, computation time requiring for the model learning is increased.

An object of the present invention is to provide a speech recognition results re-ranking technology for re-ranking speech recognition results so as to render the speech recognition results suitable for intended use of speech recognition while reducing preparation costs required prior to execution of re-ranking processing of speech recognition results.

Means to Solve the Problems

An aspect according to the present invention includes: a speech recognition unit that generates a speech recognition result set with recognition score, which is a set of speech recognition results with recognition score which are obtained by imparting a recognition score to speech recognition results, from speech data; and a re-ranking unit that generates a speech recognition result set with integrated score, which is a set of speech recognition results with integrated score which are obtained by imparting an integrated score to speech recognition results of the speech recognition result set with recognition score, from the speech recognition result set with recognition score by using a word vector expression database, a cluster center vector expression database, and a normalized knowledge information word DF value database. Text data including a word related to intended use of speech recognition is defined as a knowledge information document, and a set whose element is the knowledge information document is defined as a knowledge information document set. Database that is composed of records which include a word included in a knowledge-relevant information text set, which is text data, and a word vector corresponding to the word, is defined as the word vector expression database. Database that is composed of records which include a cluster center vector which is a center vector of each cluster generated by performing clustering with respect to a knowledge information document text vector set, which is a set of knowledge information document text vectors which are generated from the knowledge information document by using the word vector expression database, is defined as the cluster center vector expression database. Database that is composed of records which include a word, which is included in the knowledge information document set, and a normalized knowledge information word DF value which is obtained by normalizing a DF value with respect to the knowledge information document set, the DF value being a number of knowledge information documents in which the word appears, is defined as the normalized knowledge information word DF value database.

Another aspect according to the present invention includes: a speech recognition unit that generates a speech recognition result set with recognition score, which is a set of speech recognition results with recognition score which are obtained by imparting a recognition score to speech recognition results, from speech data; and a re-ranking unit that generates a speech recognition result set with integrated score, which is a set of speech recognition results with integrated score which are obtained by imparting an integrated score to speech recognition results of the speech recognition result set with recognition score, from the speech recognition result set with recognition score by using a word vector expression database and a cluster center vector expression database. Text data including a word related to intended use of speech recognition is defined as a knowledge information document, and a set whose element is the knowledge information document is defined as a knowledge information document set. Database that is composed of records which include a word included in a knowledge-relevant information text set, which is text data, and a word vector corresponding to the word, is defined as the word vector expression database. Database that is composed of records which include a cluster center vector which is a center vector of each cluster generated by performing clustering with respect to a knowledge information document text vector set, which is a set of knowledge information document text vectors which are generated from the knowledge information document by using the word vector expression database, is defined as the cluster center vector expression database.

Effects of the Invention

According to the present invention, similarity between a knowledge information document, which is text data including words related to intended use of speech recognition, and a speech recognition result is determined, being able to generate a speech recognition result which is more suitable for the intended use.

DETAILED DESCRIPTION OF THE EMBODIMENTS

Figure 1:
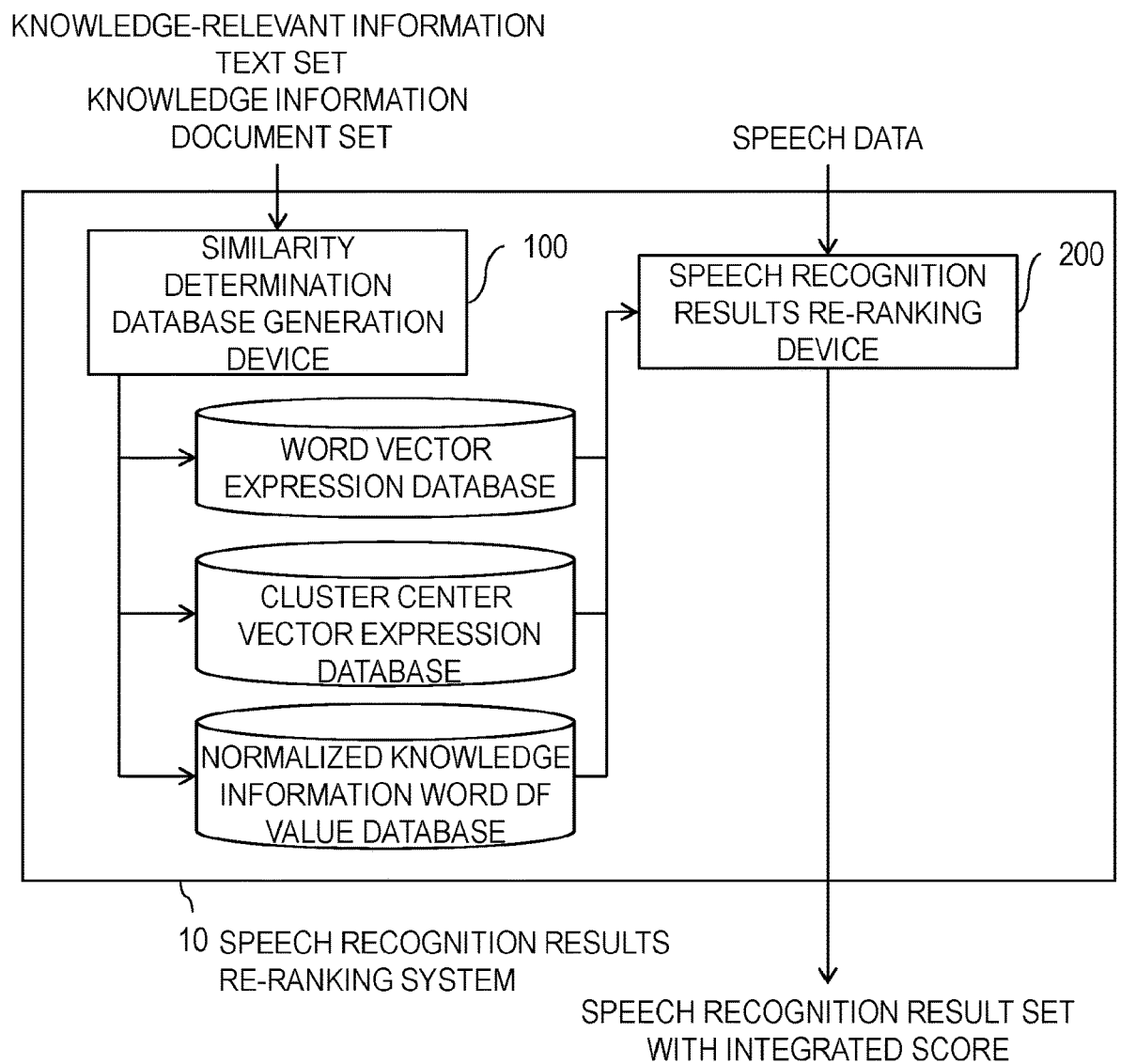
FIG. 1 is a diagram illustrating an example of the configuration of a speech recognition results re-ranking system 10.

Embodiments of the present invention are detailed below. Components having identical functions are denoted with identical reference numerals and duplicated description thereof is omitted.

Definition

Text data including words related to intended use of speech recognition is referred to as a knowledge information document. Further, a set whose elements are knowledge information documents is referred to as a knowledge information document set. It is preferable that the number of knowledge information documents is larger in general. Any method may be employed as a method for collecting knowledge information documents as long as text data including words related to intended use of speech recognition can be collected by the method.

In each embodiment described below, speech recognition results and knowledge information documents are dealt as vectors. Text data used for generating these vectors is a knowledge-relevant information text set. It is preferable that the knowledge-relevant information text set is large scale text data including wide variety of fields of words, which are not limited to intended use of speech recognition, as many as possible. Examples of a method for collecting such text data include a method using body text extraction results of a Web page which are collected by crawling, as a knowledge-relevant information text set. Needless to say, not only on a Web page but also various information disclosed on the Internet may be targeted.

First Embodiment

A speech recognition results re-ranking system 10 is first described with reference to FIG. 1. As illustrated in FIG. 1, the speech recognition results re-ranking system 10 includes a similarity determination database generation device 100 and a speech recognition results re-ranking device 200.

The similarity determination database generation device 100 generates a word vector expression database, and a cluster center vector expression database and a normalized knowledge information word DF value database which are similarity determination databases, from a knowledge-relevant information text set and a knowledge information document set. The speech recognition results re-ranking device 200 generates a speech recognition result set with integrated score, in which speech recognition results are re-ranked, from speech data by using the word vector expression database, the cluster center vector expression database, and the normalized knowledge information word DF value database and outputs the generated speech recognition result set with integrated score.

Each of the similarity determination database generation device 100 and the speech recognition results re-ranking device 200 is now described.

[Similarity Determination Database Generation Device 100]

Figure 2:
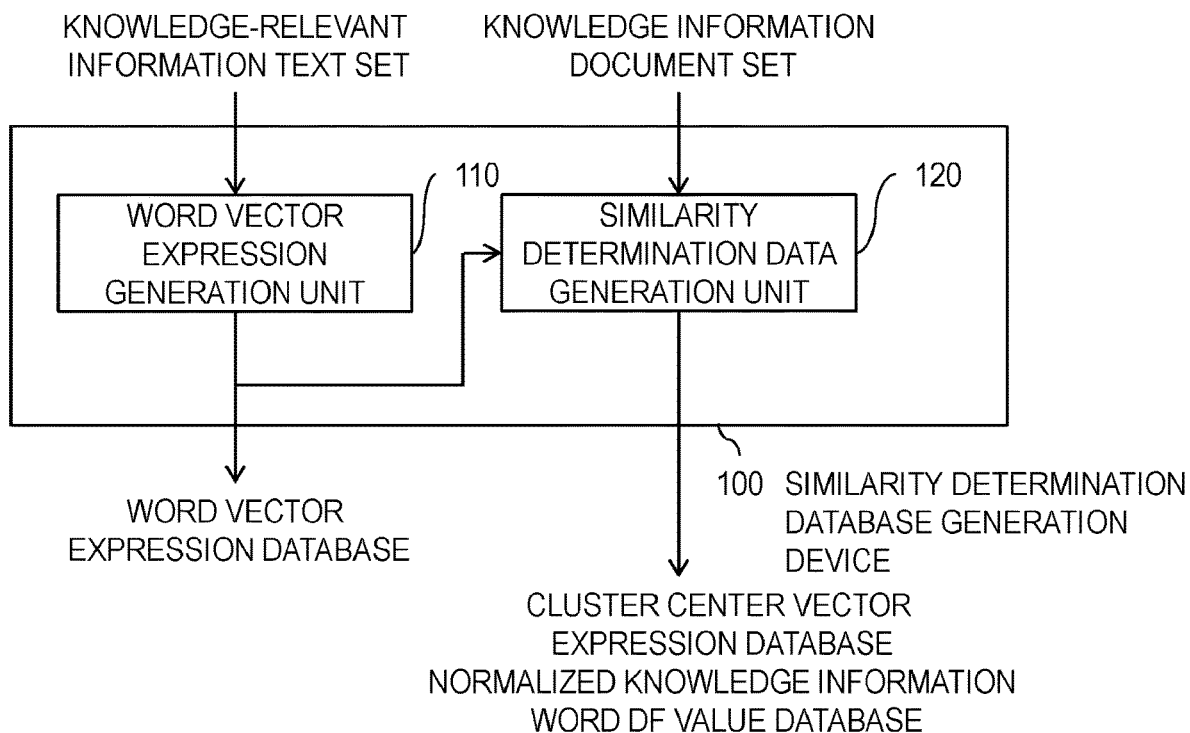
FIG. 2 is a diagram illustrating an example of the configuration of a similarity determination database generation device 100.
Figure 3:
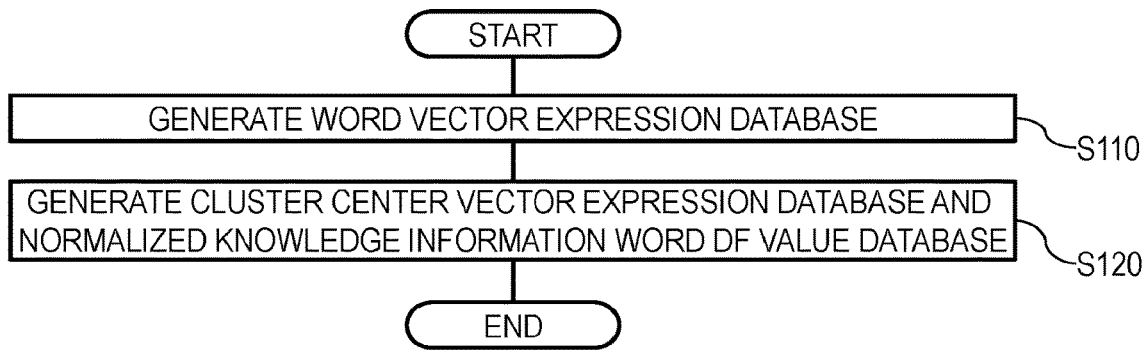
FIG. 3 is a diagram illustrating an example of an operation of the similarity determination database generation device 100.

The similarity determination database generation device 100 is described below with reference to FIG. 2 and FIG. 3. As illustrated in FIG. 2, the similarity determination database generation device 100 includes a word vector expression generation unit 110, a similarity determination data generation unit 120, and a recording unit (not shown). The recording unit is a component which records information, which is required for processing of the similarity determination database generation device 100, as appropriate. The recording unit records word vectors generated by the word vector expression generation unit 110, for example.

The similarity determination database generation device 100 generates a word vector expression database from the knowledge-relevant information text set and outputs the generated word vector expression database, and generates a cluster center vector expression database and a normalized knowledge information word DF value database as similarity determination databases from the knowledge information document set by using the word vector expression database and outputs the generated cluster center vector expression database and normalized knowledge information word DF value database.

An operation of the similarity determination database generation device 100 is described with reference to FIG. 3. The word vector expression generation unit 110 generates a word vector expression database from the knowledge-relevant information text set and outputs the generated word vector expression database (S110). A word vector is a vector which is obtained by embedding a word in a vector space, as a vector which is an element of the vector space, and is a vector generated from a word.

Specific processing of the word vector expression generation unit 110 is described below. The word vector expression generation unit 110 first executes morphological analysis with respect to each sentence included in the knowledge-relevant information text set and writes each sentence with a space between words. It is assumed that at least information on a part of speech is obtained for each of the words written with a space therebetween, through this morphological analysis. Then, the word vector expression generation unit 110 performs filtering based on a part of speech with respect to each of the words written with a space therebetween, generates word vectors corresponding to respective words, which are obtained as a result of the filtering, by using a word vector expression generation technique, and outputs the word vectors as a word vector expression database. As the word vector expression generation technique, the method (word2vec) described in Reference Non-patent Literature 1, for example, can be employed. This is a method for learning vector expression of words from a large quantity of text data which are not structured, that is, a method using the Skip-Gram model.

(Reference Non-patent Literature 1) T. Mikolov, I. Sutskever, K. Chen, G. Corrado, J. Dean, "Distributed Representations of Words and Phrases and their Compositionality", Cornell University Library, arXiv:1310.4546 [cs.CL], "https://arxiv.org/pdf/1310.4546v1.pdf", 2013.

Each record of the word vector expression database includes at least words included in the knowledge-relevant information text set and word vectors corresponding to these words. Here, only words left after the filtering based on a part of speech are objects of the word vector generation. Parts of speech left after filtering are nouns and verbs, for example.

The similarity determination data generation unit 120 generates a cluster center vector expression database and a normalized knowledge information word DF value database as similarity determination databases from the knowledge information document set by using the word vector expression database generated in S110 and outputs the generated cluster center vector expression database and the generated normalized knowledge information word DF value database (S120). The knowledge information document set is a set whose elements are knowledge information documents which are text data selected depending on intended use of speech recognition, as described above. Here, a knowledge information document may include a plurality of sentences. Further, a cluster center vector and a normalized knowledge information word DF value are used for calculation of a similarity degree score (vector similarity degree score, DF similarity degree score) representing a degree of similarity between a knowledge information document and a speech recognition result so as to determine suitability of a speech recognition result for intended use. The speech recognition results re-ranking device 200 performs the calculation of a similarity degree score.

Figure 4:
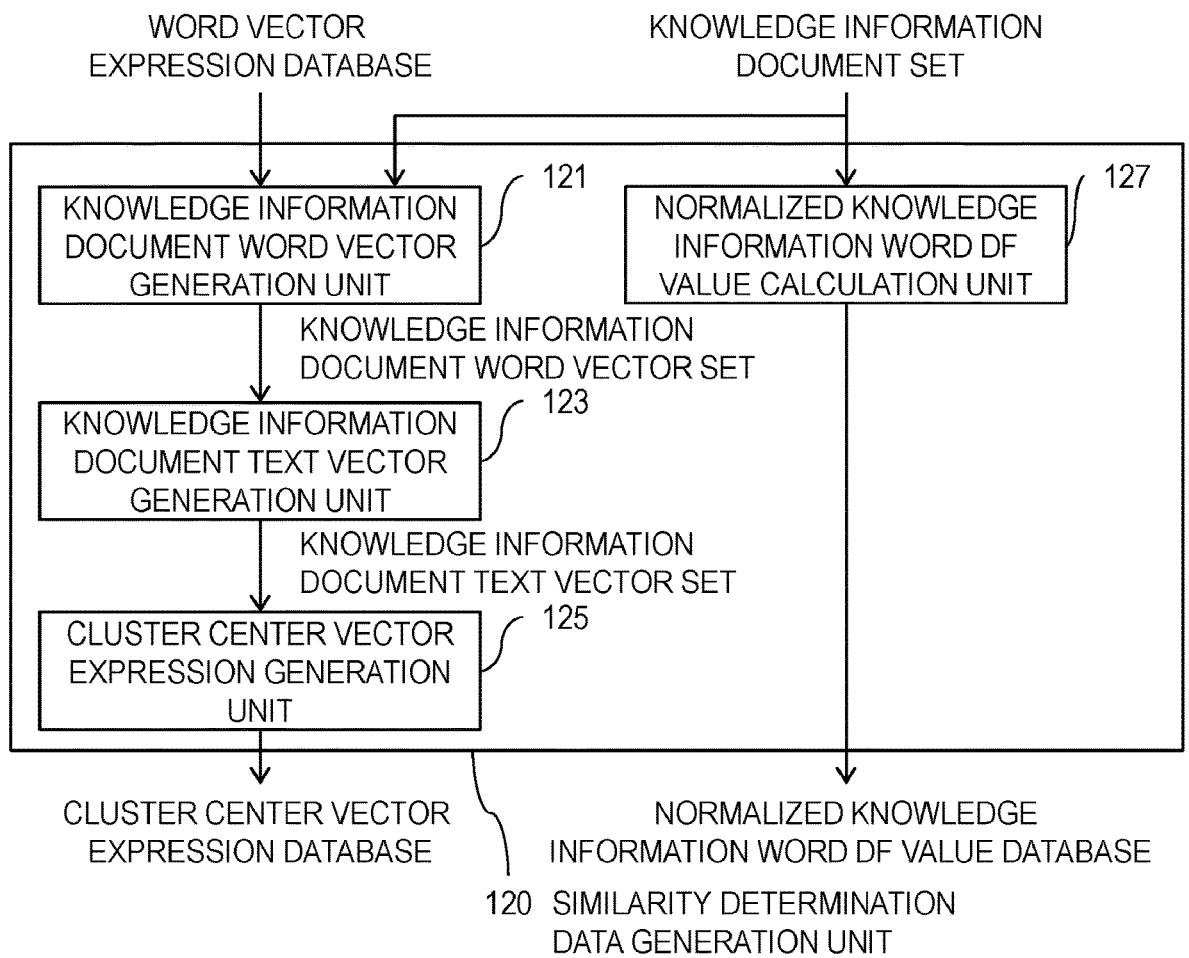
FIG. 4 is a diagram illustrating an example of the configuration of a similarity determination data generation unit 120.
Figure 5:
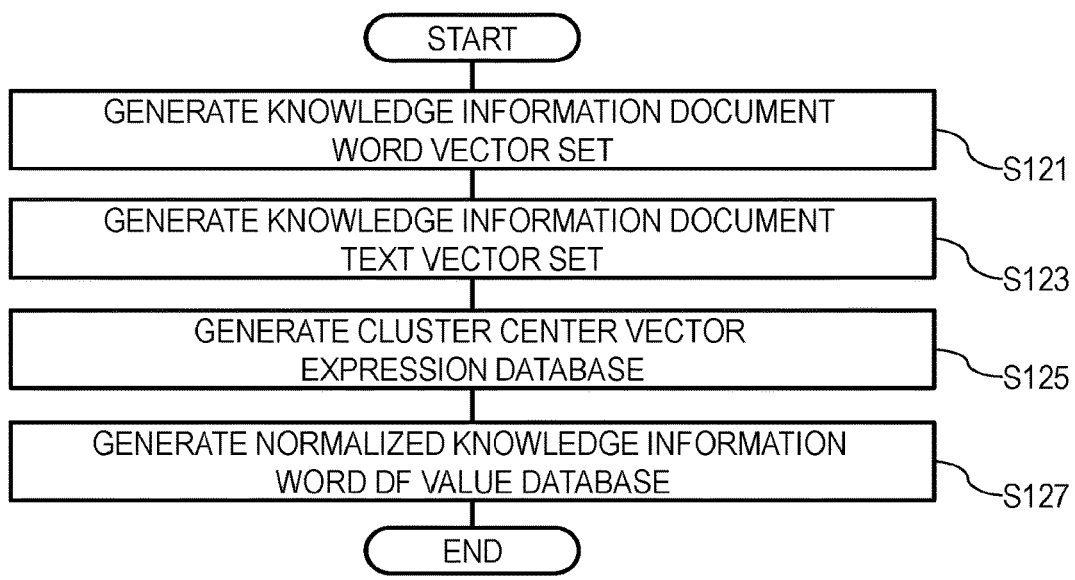
FIG. 5 is a diagram illustrating an example of an operation of the similarity determination data generation unit 120.

The similarity determination data generation unit 120 is described below with reference to FIG. 4 and FIG. 5. As illustrated in FIG. 4, the similarity determination data generation unit 120 includes a knowledge information document word vector generation unit 121, a knowledge information document text vector generation unit 123, a cluster center vector expression generation unit 125, and a normalized knowledge information word DF value calculation unit 127.

An operation of the similarity determination data generation unit 120 is described with reference to FIG. 5. The knowledge information document word vector generation unit 121 generates a knowledge information document word vector set from the knowledge information document set by using the word vector expression database generated in S110 (S121). Specific processing of the knowledge information document word vector generation unit 121 is described below. The knowledge information document word vector generation unit 121 first executes morphological analysis with respect to each sentence included in knowledge information documents, which are elements of the knowledge information document set, and writes each sentence with a space between words. The morphological analysis technique used here may be the same as that used in the word vector expression generation unit 110. Then, the knowledge information document word vector generation unit 121 performs filtering based on a part of speech with respect to each of the words written with a space therebetween and refers to the word vector expression database so as to acquire word vectors corresponding to respective words obtained as a result of the filtering. Further, the knowledge information document word vector generation unit 121 generates a knowledge information document word vector which is a set of word vectors acquired from one knowledge information document and generates a knowledge information document word vector set as a set of knowledge information document word vectors.

Accordingly, cardinality of the knowledge information document set and cardinality of knowledge information document word vector set, that is, the number of knowledge information documents and the number of knowledge information document word vectors are the same as each other.

The knowledge information document text vector generation unit 123 generates a knowledge information document text vector set from the knowledge information document word vector set generated in S121 (S123). Specifically, the knowledge information document text vector generation unit 123 generates a knowledge information document text vector from a knowledge information document word vector which is a set of word vectors per knowledge information document and generates a knowledge information document text vector set which is a set of knowledge information document text vectors. Any method may be employed as a method for generating a knowledge information document text vector as long as one knowledge information document text vector is generated by using word vectors included in a knowledge information document word vector by the method. For example, a knowledge information document text vector may be generated by using a recursive neural network described in Reference Non-patent Literature 2 or a gravity center vector of word vectors included in a knowledge information document word vector may be generated as a knowledge information document text vector.

(Reference Non-patent Literature 2) R. Socher, C. C. Lin, A. Y. Ng, C. D. Manning, "Parsing Natural Scenes and Natural Language with Recursive Neural Networks", ICML2011, pp. 129-136, 2011.

Accordingly, cardinality of the knowledge information document word vector set and cardinality of the knowledge information document text vector set, that is, the number of knowledge information document word vectors and the number of knowledge information document text vectors are the same as each other.

The cluster center vector expression generation unit 125 generates a cluster center vector expression database from the knowledge information document text vector set generated in S123 (S125). Specifically, the cluster center vector expression generation unit 125 performs clustering with respect to the knowledge information document text vector set, generates cluster center vectors which are center vectors of respective clusters generated through the clustering, and outputs the generated cluster center vectors as a cluster center vector expression database. As the clustering method, the k-means method described in Reference Non-patent Literature 3, for example, may be employed. Further, a cosine distance between vectors, for example, may be used as a distance function used for the clustering.

(Reference Non-patent Literature 3) Takashi Onoda, Miho Sakai, Seiji Yamada, "Experimental Comparison of Clustering Results for k-means by using different seeding methods", JSAI2011, 1J1-OS9-1, pp. 1-4, 2011.

Each record in the cluster center vector expression database includes at least a cluster center vector.

Through the processing from S121 to S125 described above, M pieces of cluster center vectors are generated from N pieces of knowledge information documents (here, N denotes cardinality of the knowledge information document set (that is, the number of knowledge information documents), M denotes the number of clusters generated in S125, and M≤N is satisfied in general).

The normalized knowledge information word DF value calculation unit 127 generates a normalized knowledge information word DF value database from the knowledge information document set (S127). Specific processing of the normalized knowledge information word DF value calculation unit 127 is described below. The normalized knowledge information word DF value calculation unit 127 first executes morphological analysis with respect to each sentence included in knowledge information documents, which are elements of the knowledge information document set, and writes each sentence with a space between words. The morphological analysis technique used here may be the same as that used in the word vector expression generation unit 110. Further, a result of the morphological analysis in the knowledge information document word vector generation unit 121 may be reused. Then, the normalized knowledge information word DF value calculation unit 127 calculates, for respective words written with spaces therebetween, document frequency (DF) values, which are the numbers of knowledge information documents in which the words appear, with respect to the knowledge information document set and calculates values obtained by normalizing the DF values to a range [0,1] as normalized knowledge information word DF values so as to output the normalized knowledge information word DF values as a normalized knowledge information word DF value database. Any method may be employed as a method used for normalization of DF values with respect to the knowledge information document set as long as DF values can be converted into a range [0,1] by the method. For example, a value obtained by dividing a DF value with respect to the knowledge information document set by cardinality N of the knowledge information document set may be set as a normalized knowledge information word DF value.

Each record of the normalized knowledge information word DF value database includes at least words included in the knowledge information document set and normalized knowledge information word DF values which are obtained by normalizing DF values, which are the numbers of knowledge information documents in which the words appear, with respect to the knowledge information document set.

[Speech Recognition Results Re-Ranking Device 200]

Figure 6:
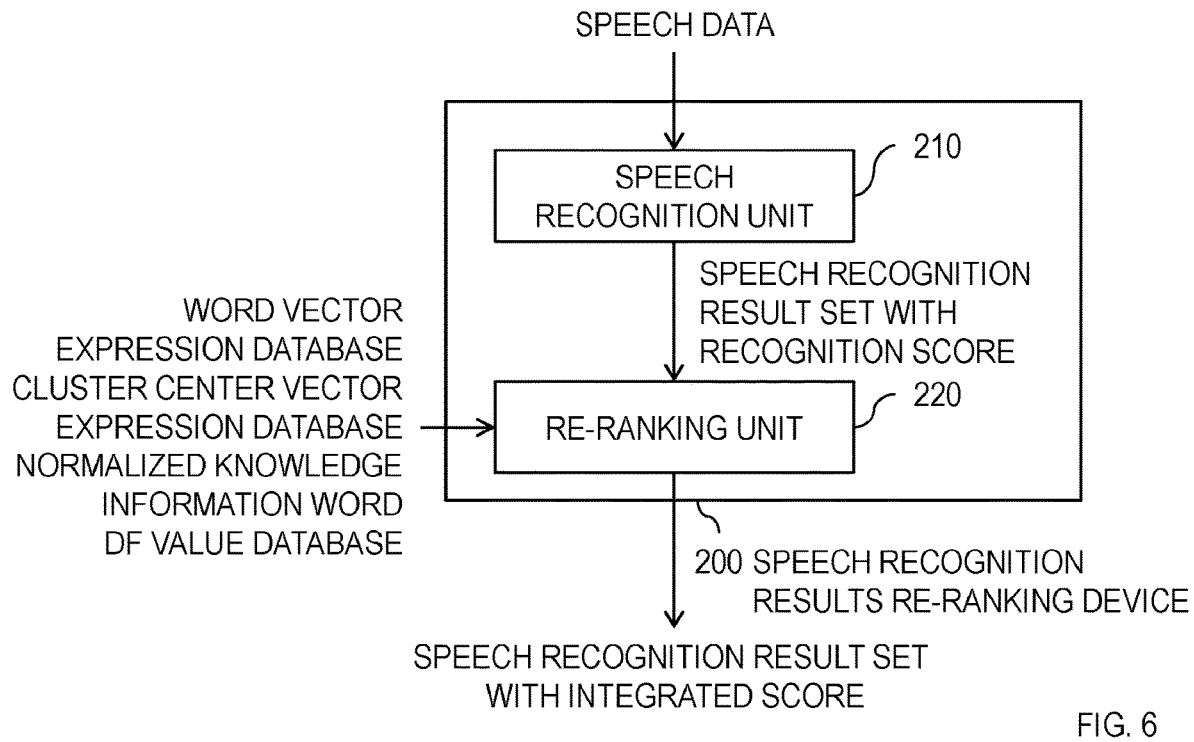
FIG. 6 is a diagram illustrating an example of the configuration of a speech recognition results re-ranking device 200.
Figure 7:
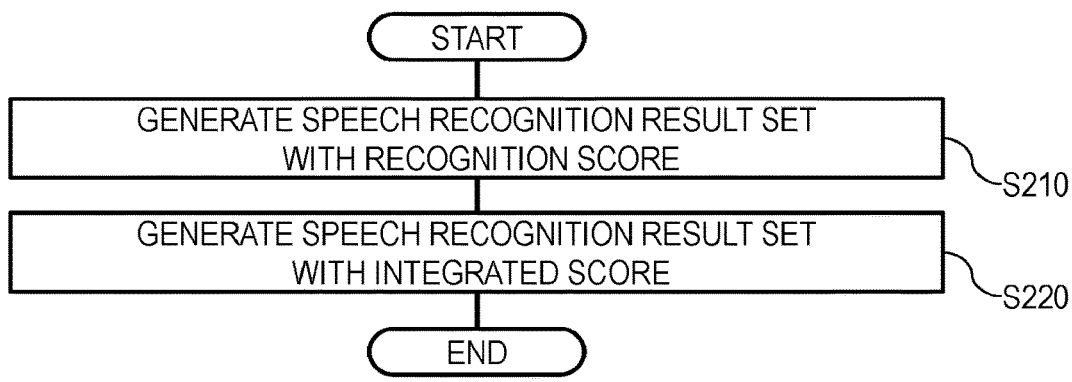
FIG. 7 is a diagram illustrating an example of an operation of the speech recognition results re-ranking device 200.

The speech recognition results re-ranking device 200 is described below with reference to FIG. 6 and FIG. 7. As illustrated in FIG. 6, the speech recognition results re-ranking device 200 includes a speech recognition unit 210, a re-ranking unit 220, and a recording unit (not shown). The recording unit is a component which records information, which is required for processing of the speech recognition results re-ranking device 200, as appropriate.

The speech recognition results re-ranking device 200 generates a speech recognition result set with integrated score, from speech data and outputs the generated speech recognition result set with integrated score. In this case, the word vector expression database, the cluster center vector expression database, and the normalized knowledge information word DF value database which are generated by the similarity determination database generation device 100 are used.

An operation of the speech recognition results re-ranking device 200 is described with reference to FIG. 7. The speech recognition unit 210 generates a speech recognition result set with recognition score which is a set of speech recognition results with recognition score, which are obtained by imparting a recognition score to speech recognition results, from the speech data (S210). Any method may be employed for speech recognition of speech data as long as a speech recognition result which is text data and a recognition score which is a numerical value representing accuracy of speech recognition are simultaneously generated by the method. A numerical value such as reliability, a sound score, and a language score may be used as a recognition score.

The re-ranking unit 220 generates a speech recognition result set with integrated score which is a set of speech recognition results with integrated score, which are obtained by imparting an integrated score to speech recognition results of the speech recognition result set with recognition score, from the speech recognition result set with recognition score generated in S210, by using the word vector expression database, the cluster center vector expression database, and the normalized knowledge information word DF value database (S220). An integrated score is a score (numerical value) calculated by using a recognition score and similarity degree scores (vector similarity degree score, DF similarity degree score).

In the processing in S220, speech recognition results obtained by substituting integrated scores for recognition scores imparted to respective speech recognition results of the speech recognition result set with recognition score are generated as the speech recognition result set with integrated score.

Figure 8:
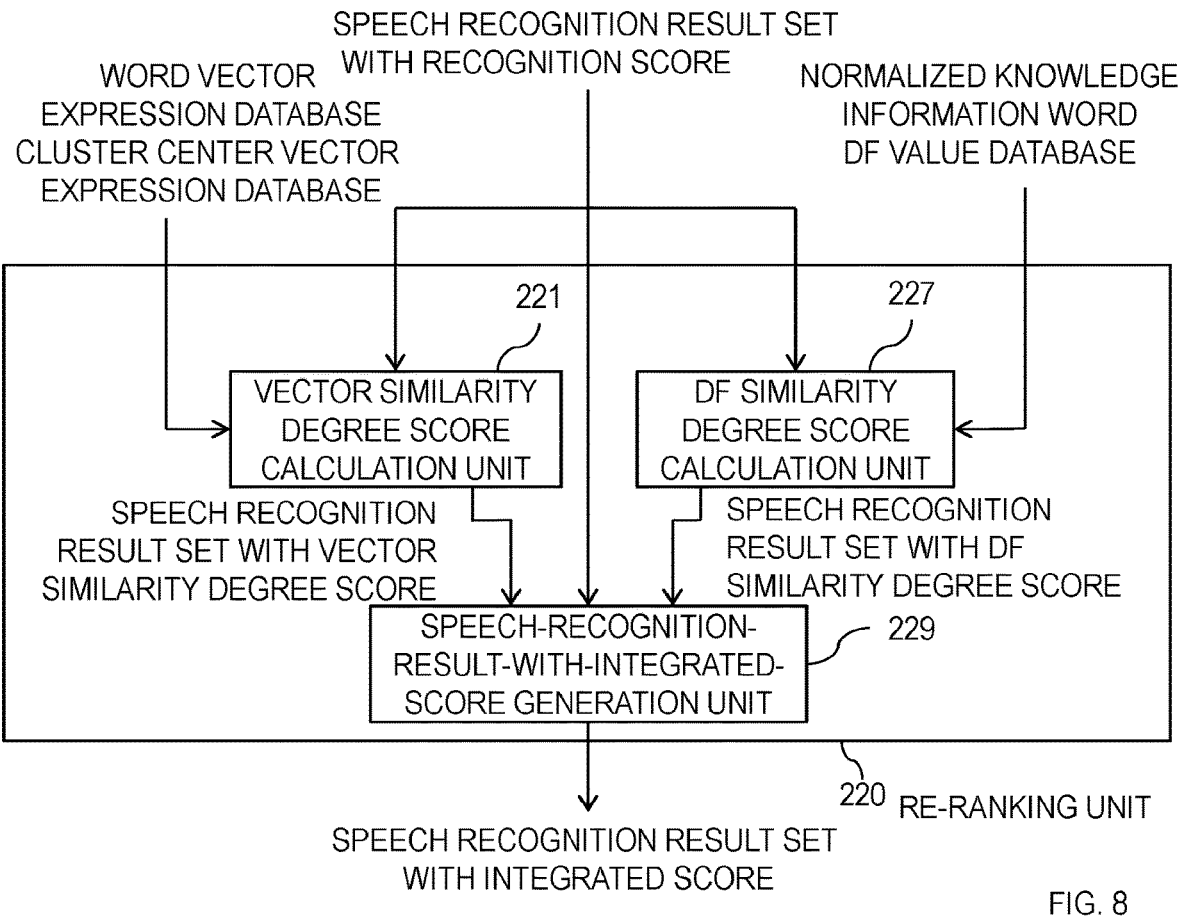
FIG. 8 is a diagram illustrating an example of the configuration of a re-ranking unit 220.
Figure 9:
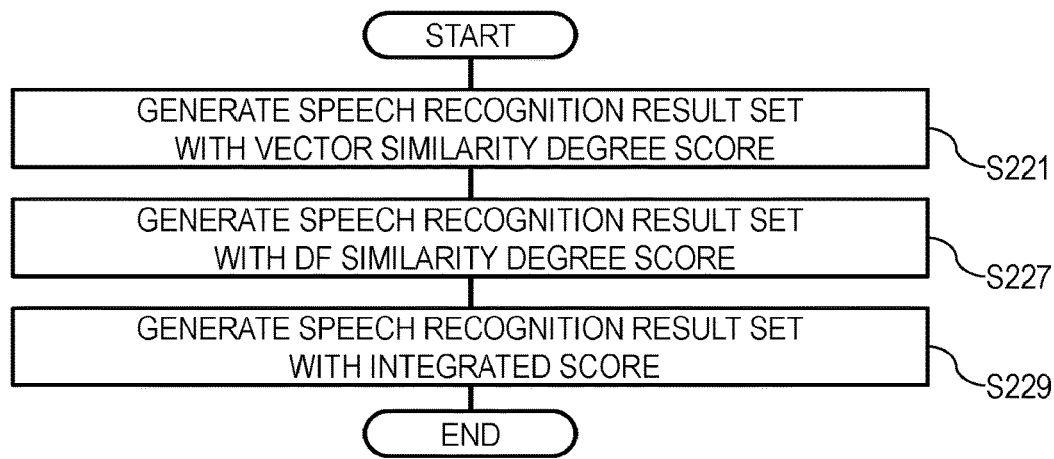
FIG. 9 is a diagram illustrating an example of an operation of the re-ranking unit 220.

The re-ranking unit 220 is described below with reference to FIG. 8 and FIG. 9. As illustrated in FIG. 8, the re-ranking unit 220 includes a vector similarity degree score calculation unit 221, a DF similarity degree score calculation unit 227, and a speech-recognition-result-with-integrated-score generation unit 229.

An operation of the re-ranking unit 220 is described with reference to FIG. 9. The vector similarity degree score calculation unit 221 calculates vector similarity degree scores with respect to speech recognition results of the speech recognition result set with recognition score from the speech recognition result set with recognition score generated in S210, by using the word vector expression database and the cluster center vector expression database, and generates a speech recognition result set with vector similarity degree score which is a set of speech recognition results with vector similarity degree score which are obtained by imparting a vector similarity degree score to speech recognition results (S221).

Figure 10:
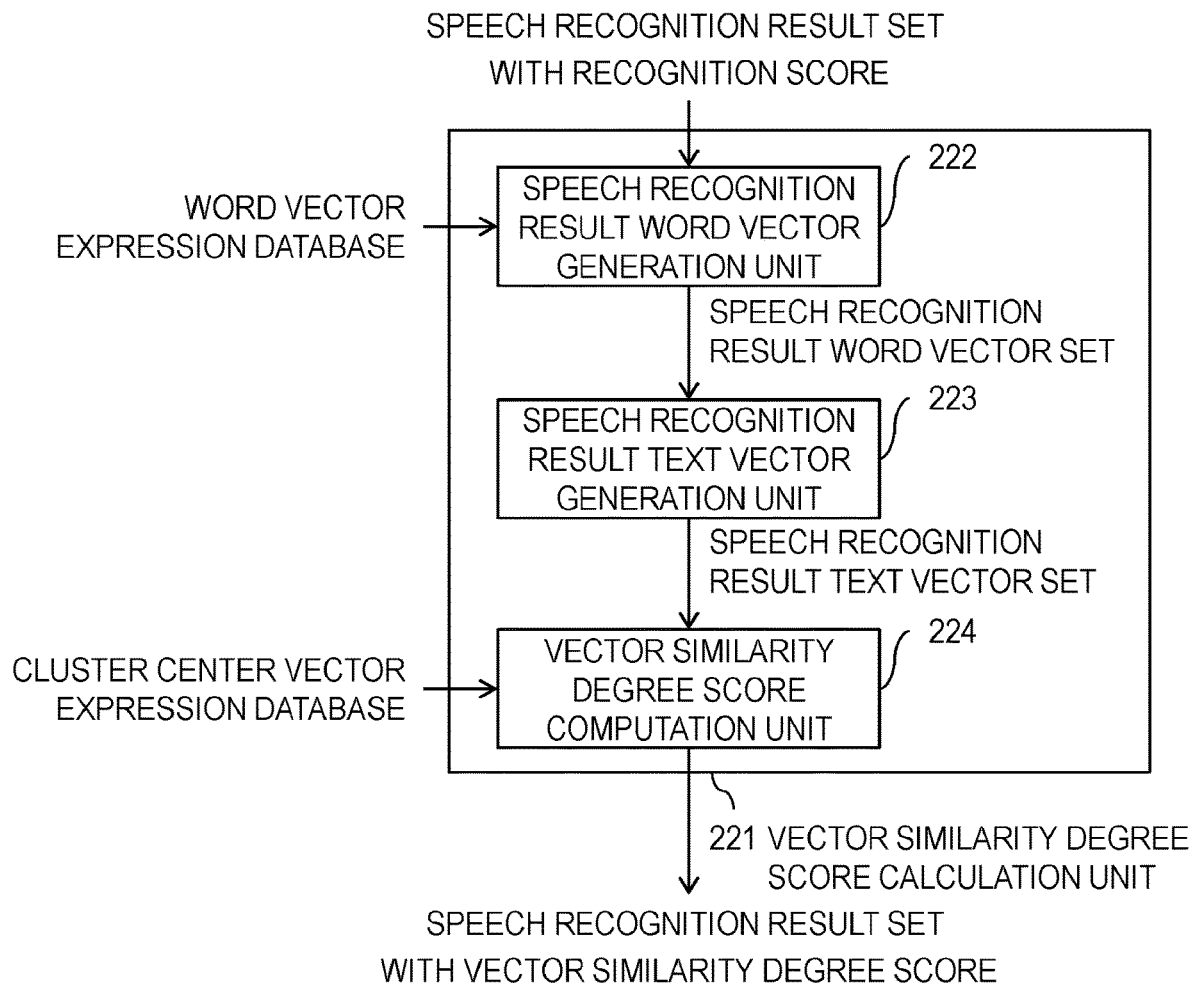
FIG. 10 is a diagram illustrating an example of the configuration of a vector similarity degree score calculation unit 221.
Figure 11:
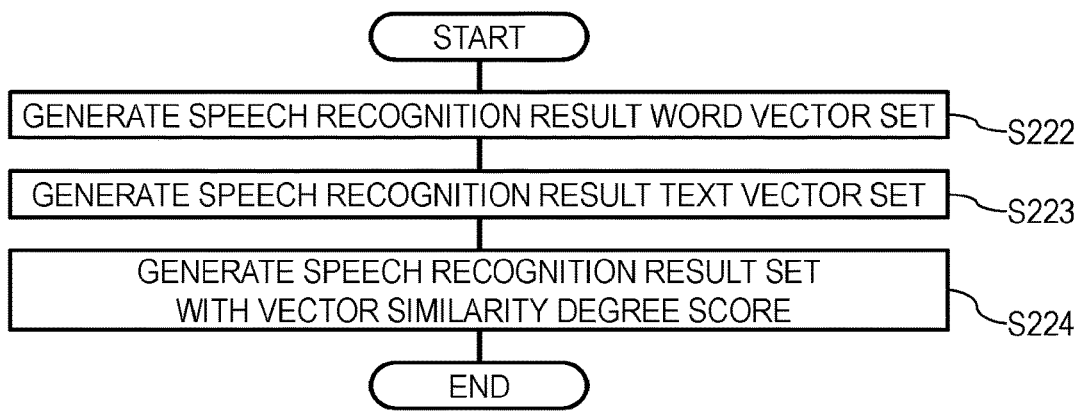
FIG. 11 is a diagram illustrating an example of an operation of the vector similarity degree score calculation unit 221.

The vector similarity degree score calculation unit 221 is described in detail below with reference to FIG. 10 and FIG. 11. As illustrated in FIG. 10, the vector similarity degree score calculation unit 221 includes a speech recognition result word vector generation unit 222, a speech recognition result text vector generation unit 223, and a vector similarity degree score computation unit 224.

An operation of the vector similarity degree score calculation unit 221 is described with reference to FIG. 11. The speech recognition result word vector generation unit 222 generates a speech recognition result word vector set from a speech recognition result set with recognition score by using the word vector expression database (S222). The processing of the speech recognition result word vector generation unit 222 is the same as the processing of the knowledge information document word vector generation unit 121 and is specifically described below. The speech recognition result word vector generation unit 222 first executes morphological analysis with respect to each sentence included in speech recognition results and writes each sentence with a space between words. The morphological analysis technique used here may be the same as that used in the word vector expression generation unit 110. Then, the speech recognition result word vector generation unit 222 performs filtering based on a part of speech with respect to each of the words written with a space therebetween and refers to the word vector expression database so as to acquire word vectors corresponding to respective words obtained as a result of the filtering. Further, the speech recognition result word vector generation unit 222 generates a speech recognition result word vector which is a set of word vectors acquired from one speech recognition result and generates a speech recognition result word vector set as a set of speech recognition result word vectors.

Accordingly, cardinality of the speech recognition result set with recognition score and cardinality of the speech recognition result word vector set, that is, the number of speech recognition results with recognition score and the number of speech recognition result word vectors are the same as each other.

The speech recognition result text vector generation unit 223 generates a speech recognition result text vector set from the speech recognition result word vector set generated in S222 (S223). The processing of the speech recognition result text vector generation unit 223 is the same as the processing of the knowledge information document text vector generation unit 123 and is specifically described below. The speech recognition result text vector generation unit 223 generates speech recognition result text vectors from the speech recognition result word vector and generates a speech recognition result text vector set which is a set of the speech recognition result text vectors. The method for generating a speech recognition result text vector may be the same as that used in the knowledge information document text vector generation unit 123.

Accordingly, cardinality of the speech recognition result word vector set and cardinality of the speech recognition result text vector set, that is, the number of speech recognition result word vectors and the number of speech recognition result text vectors are the same as each other.

The vector similarity degree score computation unit 224 generates a speech recognition result set with vector similarity degree score from the speech recognition result text vector set generated in S223, by using the cluster center vector expression database (S224). Specific processing of the vector similarity degree score computation unit 224 is described below. The vector similarity degree score computation unit 224 first computes a vector similarity degree of a cluster center vector which is an entry of the cluster center vector expression database with respect to each speech recognition result text vector. A cosine similarity degree between vectors, for example, may be used as a vector similarity degree. Then, the vector similarity degree score computation unit 224 computes a vector similarity degree score based on a plurality of vector similarity degrees obtained with respect to one speech recognition result text vector. For the method for calculating a vector similarity degree score, a sum, an average, and the maximum value, for example, of a plurality of vector similarity degrees obtained with respect to one speech recognition result text vector may be employed.

Larger values of vector similarity degree scores thus calculated for respective speech recognition result text vectors represent that speech recognition results corresponding to these speech recognition results text vectors are more suitable for intended use.

The DF similarity degree score calculation unit 227 calculates DF similarity degree scores with respect to speech recognition results of the speech recognition result set with recognition score from the speech recognition result set with recognition score generated in S210, by using the normalized knowledge information word DF value database, and generates a speech recognition result set with DF similarity degree score which is a set of speech recognition results with DF similarity degree score obtained by imparting a DF similarity degree score to speech recognition results (S227). Specific processing of the DF similarity degree score calculation unit 227 is described below. The DF similarity degree score calculation unit 227 first executes morphological analysis with respect to each sentence included in speech recognition results and writes each sentence with a space between words. The morphological analysis technique used here may be the same as that used in the word vector expression generation unit 110. Further, a result of the morphological analysis in the vector similarity degree score calculation unit 221 may be reused. Then, the DF similarity degree score calculation unit 227 performs filtering based on a part of speech with respect to each of the words written with a space therebetween and refers to the normalized knowledge information word DF value database so as to acquire normalized knowledge information word DF values corresponding to respective words obtained as a result of the filtering. Further, the DF similarity degree score calculation unit 227 calculates a DF similarity degree score from a plurality of normalized knowledge information word DF values obtained with respect to one speech recognition result (each normalized knowledge information word DF value after the filtering included in a speech recognition result). For the method for calculating a DF similarity degree score, a sum, an average, and the maximum value, for example, of a plurality of normalized knowledge information word DF values obtained with respect to one speech recognition result may be employed.

Larger values of DF similarity degree scores thus calculated for respective speech recognition results represent that these speech recognition results are more suitable for intended use.

The speech-recognition-result-with-integrated-score generation unit 229 generates a speech recognition result set with integrated score from the speech recognition result set with recognition score generated in S210, the speech recognition result set with vector similarity degree score generated in S221, and the speech recognition result set with DF similarity degree score generated in S227 (S229). Specifically, the speech-recognition-result-with-integrated-score generation unit 229 calculates an integrated score for each speech recognition result from the recognition score, the vector similarity degree score, and the DF similarity degree score and generates a speech recognition result set with integrated score which is a set of speech recognition results with integrated score obtained by imparting an integrated score with respect to speech recognition results. Any method may be employed as the method for calculating an integrated score as long as one score is calculated from three scores, such as a weighted linear sum of three scores, by the method. When suitability for intended use is desired to be prioritized over speech recognition accuracy, for example, an integrated score may be calculated by setting the weights of the vector similarity degree score and the DF similarity degree score relatively larger than the weight of the recognition score.

According to this embodiment of the present invention, similarity between a knowledge information document, which is text data including words related to intended use of speech recognition, and a speech recognition result is determined, being able to generate a speech recognition result which is more suitable for intended use. Chief preparation required for the similarity determination is collection of knowledge information documents which are text data including words related to intended use of speech recognition and thus, preparation of correct sentences, which are obtained by transcribing speech contents of speech data, as learning data is not required, being able to reduce labor prior to execution of re-ranking processing. Further, chief computation required for calculating a similarity score in the execution of the re-ranking is vector operation and in addition to this, objects of the vector operation are narrowed down by clustering, being able to lower a computation cost.

Second Embodiment

Whether or not a speech recognition result is suitable for intended use is evaluated by using two similarity degree scores which are the vector similarity degree score and the DF similarity degree score, in the first embodiment. However, an integrated score is not necessarily calculated by using two similarity degrees.

Accordingly, the second embodiment provides a description of a speech recognition results re-ranking system in which speech recognition results are re-ranked based on an integrated score calculated by using only the vector similarity degree score as a similarity degree score.

Figure 12:
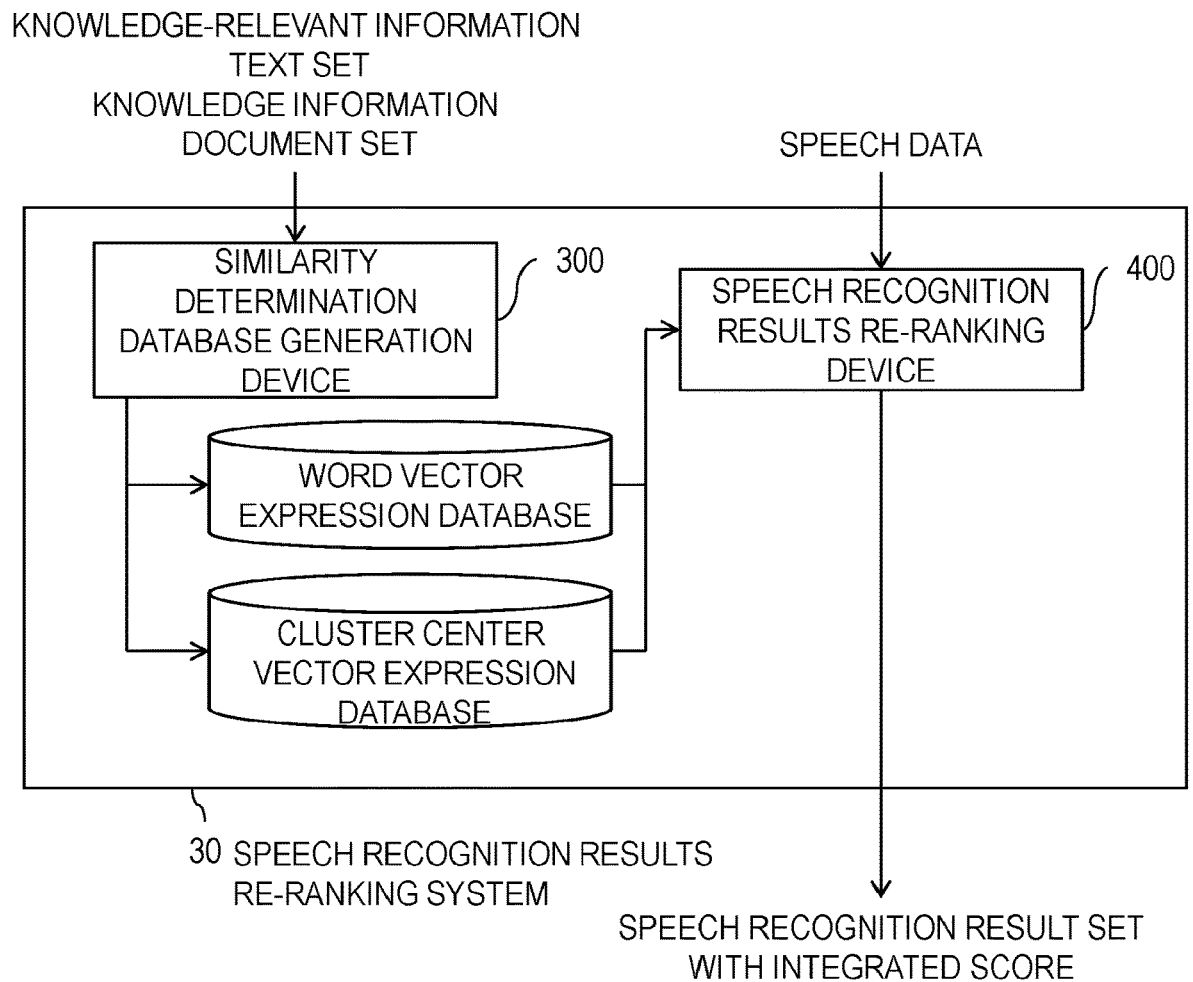
FIG. 12 is a diagram illustrating an example of the configuration of a speech recognition results re-ranking system 30.

A speech recognition results re-ranking system 30 is first described with reference to FIG. 12. As illustrated in FIG. 12, the speech recognition results re-ranking system 30 includes a similarity determination database generation device 300 and a speech recognition results re-ranking device 400.

The similarity determination database generation device 300 generates a word vector expression database and a cluster center vector expression database which is a similarity determination database from a knowledge-relevant information text set and a knowledge information document set. The speech recognition results re-ranking device 400 generates a speech recognition result set with integrated score, in which speech recognition results are re-ranked, from speech data by using the word vector expression database and the cluster center vector expression database and outputs the generated speech recognition result set with integrated score.

Each of the similarity determination database generation device 300 and the speech recognition results re-ranking device 400 is now described.

[Similarity Determination Database Generation Device 300]

Figure 13:
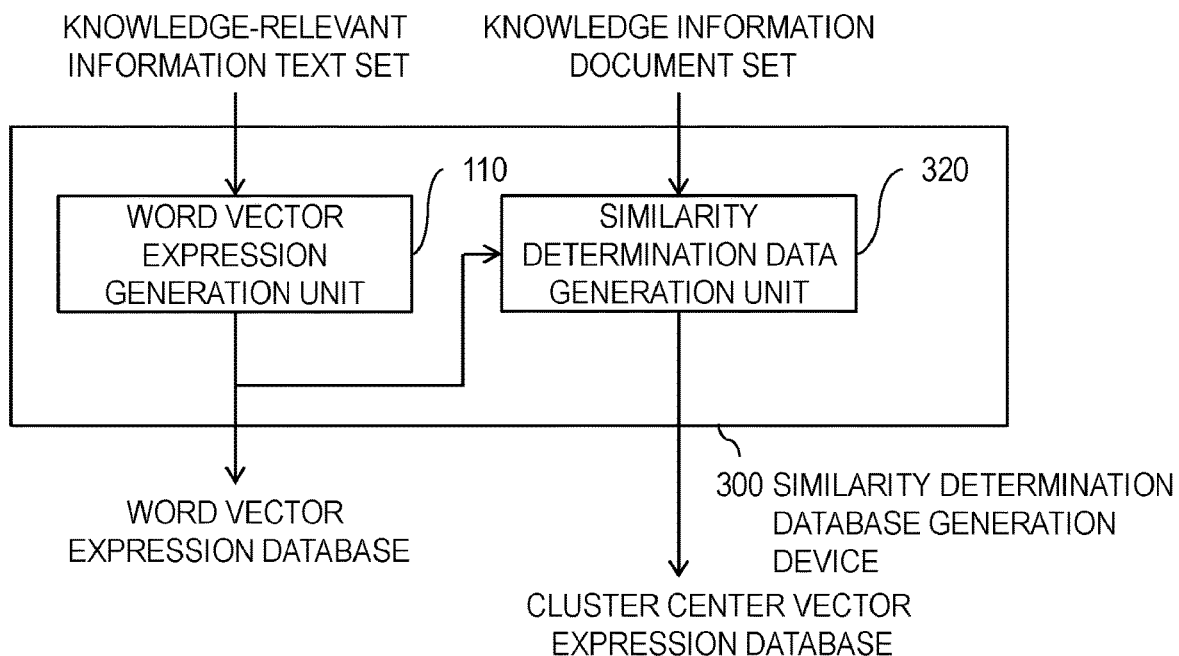
FIG. 13 is a diagram illustrating an example of the configuration of a similarity determination database generation device 300.
Figure 14:
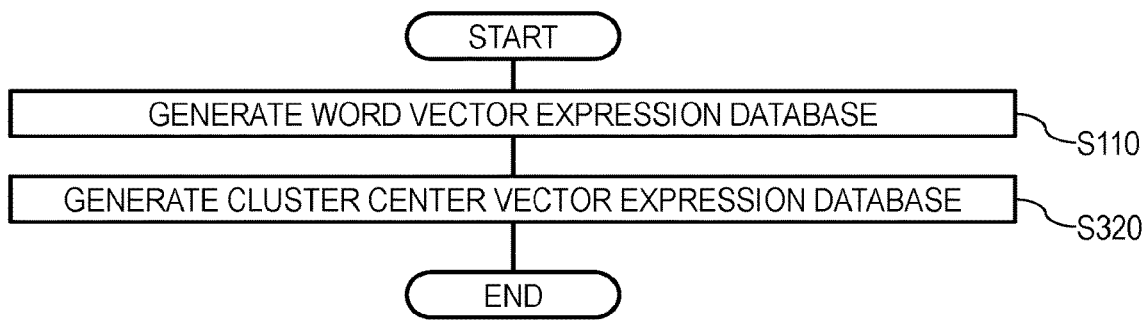
FIG. 14 is a diagram illustrating an example of an operation of the similarity determination database generation device 300.

The similarity determination database generation device 300 is described below with reference to FIG. 13 and FIG. 14. As illustrated in FIG. 13, the similarity determination database generation device 300 includes a word vector expression generation unit 110, a similarity determination data generation unit 320, and a recording unit (not shown). The recording unit is a component which records information, which is required for processing of the similarity determination database generation device 300, as appropriate.

The similarity determination database generation device 300 generates a word vector expression database from the knowledge-relevant information text set and outputs the generated word vector expression database, and generates a cluster center vector expression database as a similarity determination database from the knowledge information document set by using the word vector expression database and outputs the generated cluster center vector expression database.

An operation of the similarity determination database generation device 300 is described with reference to FIG. 14. The word vector expression generation unit 110 generates a word vector expression database from the knowledge-relevant information text set and outputs the generated word vector expression database (S110).

Figure 15:
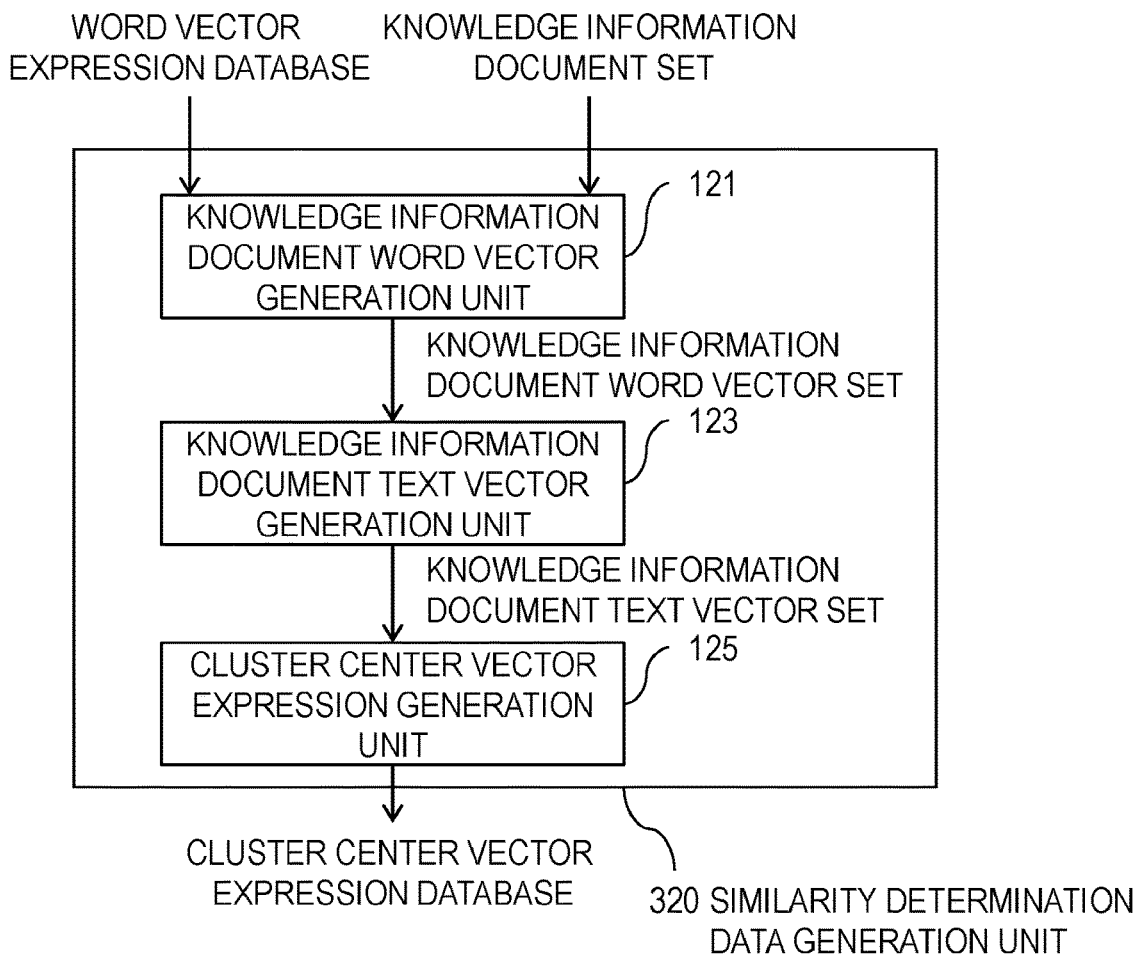
FIG. 15 is a diagram illustrating an example of the configuration of a similarity determination data generation unit 320.
Figure 16:
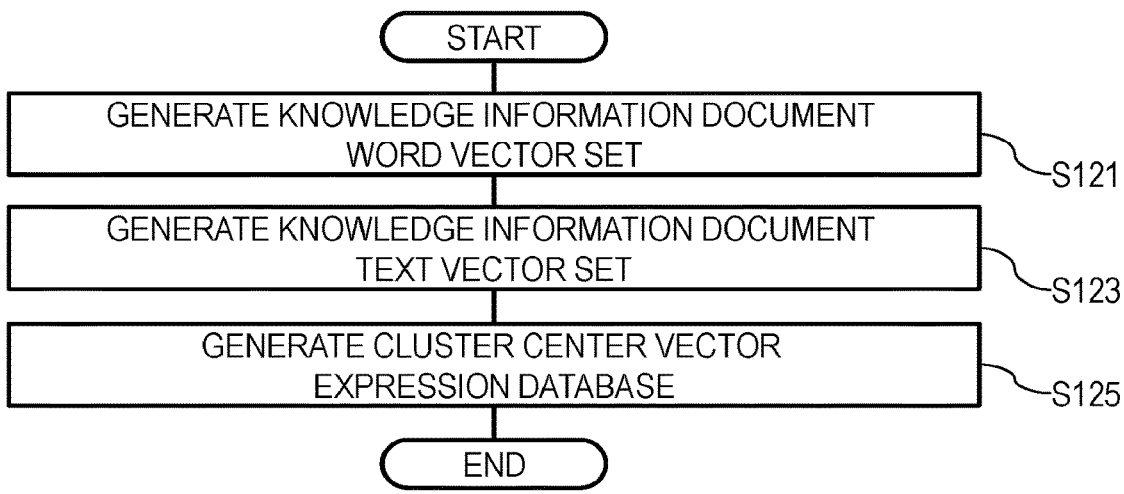
FIG. 16 is a diagram illustrating an example of an operation of the similarity determination data generation unit 320.

The similarity determination data generation unit 320 generates a cluster center vector expression database as a similarity determination database from the knowledge information document set by using the word vector expression database generated in S110 and outputs the generated cluster center vector expression database (S320). The similarity determination data generation unit 320 is different from the similarity determination data generation unit 120 in that the similarity determination data generation unit 320 generates only a cluster center vector expression database. Accordingly, the configuration and the operation of the similarity determination data generation unit 320 are obtained by simplifying the configuration and the operation of the similarity determination data generation unit 120 as illustrated in FIG. 15 and FIG. 16.

[Speech Recognition Results Re-Ranking Device 400]

Figure 17:
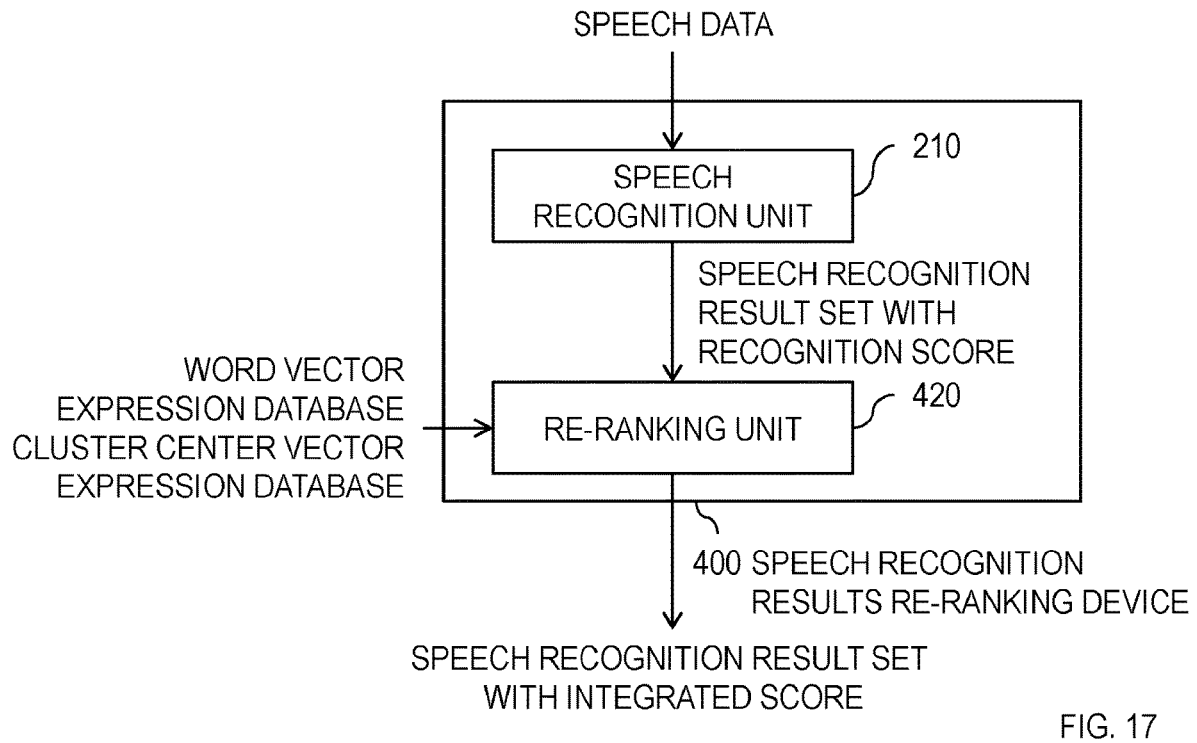
FIG. 17 is a diagram illustrating an example of the configuration of a speech recognition results re-ranking device 400.
Figure 18:
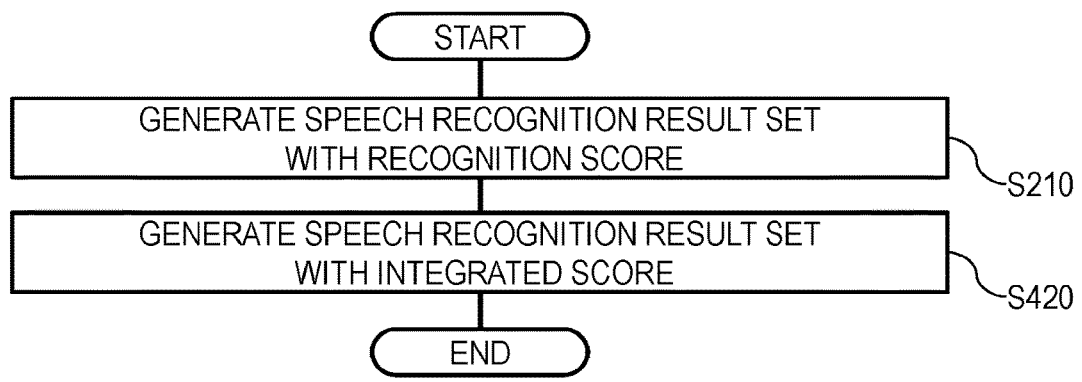
FIG. 18 is a diagram illustrating an example of an operation of the speech recognition results re-ranking device 400.

The speech recognition results re-ranking device 400 is described below with reference to FIG. 17 and FIG. 18. As illustrated in FIG. 17, the speech recognition results re-ranking device 400 includes a speech recognition unit 210, a re-ranking unit 420, and a recording unit (not shown). The recording unit is a component which records information, which is required for processing of the speech recognition results re-ranking device 400, as appropriate.

The speech recognition results re-ranking device 400 generates a speech recognition result set with integrated score, from speech data and outputs the generated speech recognition result set with integrated score. In this case, the word vector expression database and the cluster center vector expression database which are generated by the similarity determination database generation device 300 are used.

An operation of the speech recognition results re-ranking device 400 is described with reference to FIG. 18. The speech recognition unit 210 generates a speech recognition result set with recognition score which is a set of speech recognition results with recognition score, which are obtained by imparting a recognition score to speech recognition results, from the speech data (S210).

The re-ranking unit 420 generates a speech recognition result set with integrated score which is a set of speech recognition results with integrated score, which are obtained by imparting an integrated score to speech recognition results of the speech recognition result set with recognition score, from the speech recognition result set with recognition score generated in S210, by using the word vector expression database and the cluster center vector expression database (S420).

Figure 19:
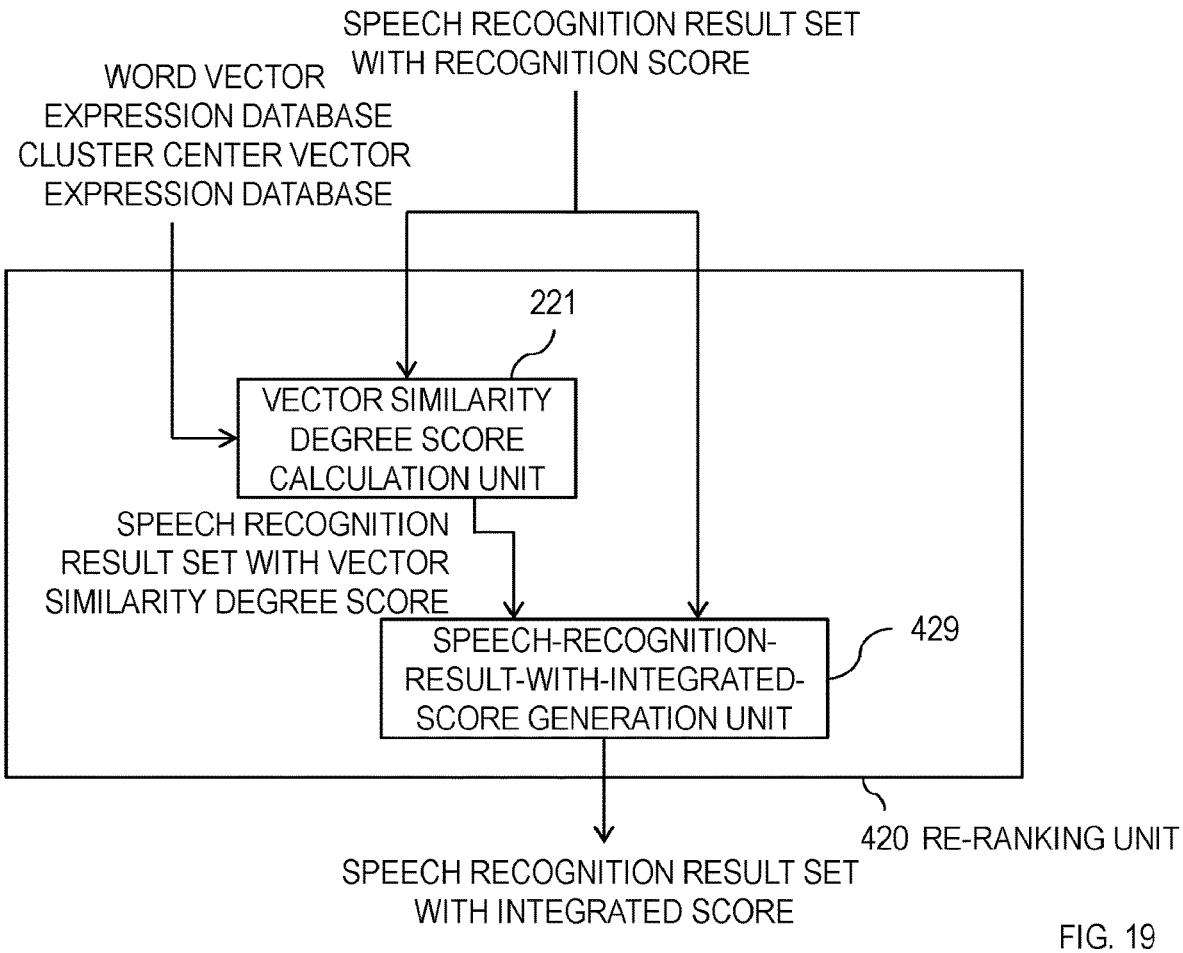
FIG. 19 is a diagram illustrating an example of the configuration of a re-ranking unit 420.
Figure 20:
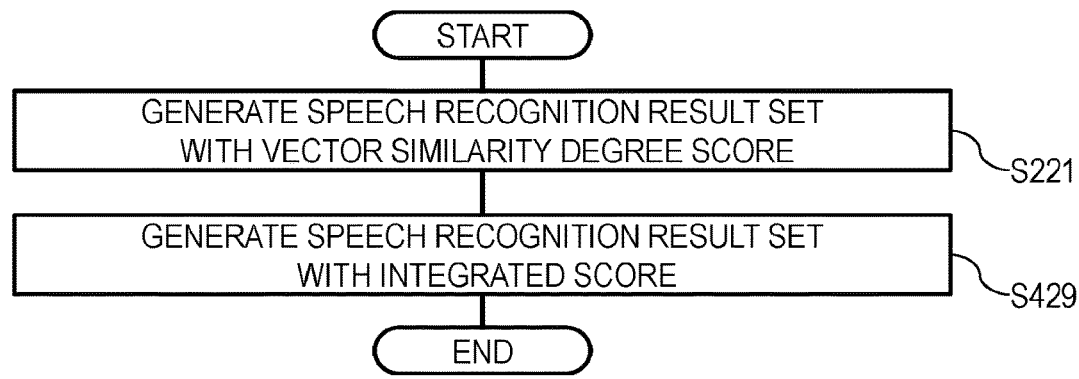
FIG. 20 is a diagram illustrating an example of an operation of the re-ranking unit 420.

The re-ranking unit 420 is described below with reference to FIG. 19 and FIG. 20. As illustrated in FIG. 19, the re-ranking unit 420 includes a vector similarity degree score calculation unit 221 and a speech-recognition-result-with-integrated-score generation unit 429.

An operation of the re-ranking unit 420 is described with reference to FIG. 20. The vector similarity degree score calculation unit 221 calculates vector similarity degree scores with respect to speech recognition results of the speech recognition result set with recognition score from the speech recognition result set with recognition score generated in S210, by using the word vector expression database and the cluster center vector expression database, and generates a speech recognition result set with vector similarity degree score which is a set of speech recognition results with vector similarity degree score which are obtained by imparting a vector similarity degree score to speech recognition results (S221).

The speech-recognition-result-with-integrated-score generation unit 429 generates a speech recognition result set with integrated score from the speech recognition result set with recognition score generated in S210 and the speech recognition result set with vector similarity degree score generated in S221 (S429). Specifically, the speech-recognition-result-with-integrated-score generation unit 429 calculates an integrated score for each speech recognition result from the recognition score and the vector similarity degree score and generates a speech recognition result set with integrated score which is a set of speech recognition results with integrated score obtained by imparting an integrated score with respect to speech recognition results. Any method may be employed as the method for calculating an integrated score as long as one score is calculated from two scores, such as a weighted linear sum of two scores, by the method.

According to this embodiment of the present invention, similarity between a knowledge information document, which is text data including words related to intended use of speech recognition, and a speech recognition result is determined, being able to generate a speech recognition result which is more suitable for intended use. Chief preparation required for the similarity determination is collection of knowledge information documents which are text data including words related to intended use of speech recognition and thus, preparation of correct sentences, which are obtained by transcribing speech contents of speech data, as learning data is not required, being able to reduce labor prior to execution of re-ranking processing. Further, chief computation required for calculating a similarity score in the execution of the re-ranking is vector operation and in addition to this, objects of the vector operation are narrowed down by clustering, being able to lower a computation cost.

APPENDIX

Each device according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

The present invention is not limited to the above embodiments, but modifications may be made within the scope of the present invention. Also, the processes described in the embodiments may be executed not only in a chronological sequence in accordance with the order of their description but may be executed in parallel or separately according to the processing capability of the device executing the processing or any necessity.

As already mentioned, when the processing functions of the hardware entities described in the embodiments (the devices of the present invention) are to be embodied with a computer, the processing details of the functions to be provided by the hardware entities are described by a program. By the program then being executed on the computer, the processing functions of the hardware entity are embodied on the computer.

The program describing the processing details can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing details may instead be embodied with hardware.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A speech recognition results re-ranking device comprising:
    processing circuitry configured to
        generate a first speech recognition result set with recognition score from speech data, the first speech recognition result set with recognition score being a set of speech recognition results with recognition score, the speech recognition results with recognition score being obtained by imparting a recognition score to the speech recognition results; and
        generate a second speech recognition result set with integrated score from the first speech recognition result set with recognition score, the second speech recognition result set with integrated score being a set of speech recognition results with integrated score, the speech recognition results with integrated score being obtained by imparting the integrated score to the speech recognition results of the first speech recognition result set with the recognition score, by using a word vector expression database, a cluster center vector expression database, and a normalized knowledge information word DF value database, wherein
    text data including a word related to intended use of speech recognition is defined as a knowledge information document, and a set whose element is the knowledge information document is defined as a knowledge information document set,
    the word vector expression database is composed of records which include a word included in a knowledge-relevant information text set and a word vector corresponding to the word
    the cluster center vector expression database is composed of records which include a cluster center vector which is a center vector of each cluster generated by performing clustering with respect to a knowledge information document text vector set, the knowledge information document text vector set being a set of knowledge information document text vectors, the knowledge information document text vectors being generated from the knowledge information document by using the word vector expression database, and
    the normalized knowledge information word DF value database is composed of records which include a word, the word being included in the knowledge information document set, and a normalized knowledge information word DF value which is obtained by normalizing a DF value with respect to the knowledge information document set, the DF value being a number of knowledge information documents in which the word appears.

2. The speech recognition results re-ranking device according to claim 1, wherein
    the processing circuitry is further configured to
        calculate a vector similarity degree score with respect to speech recognition results of the first speech recognition result set with recognition score from the first speech recognition result set with recognition score, by using the word vector expression database and the cluster center vector expression database, and generate a third speech recognition result set with vector similarity degree score, the third speech recognition result set with the vector similarity degree score being a set of speech recognition results with vector similarity degree score, the speech recognition results with vector similarity degree score being obtained by imparting a vector similarity degree score to the speech recognition results,
        calculate a DF similarity degree score with respect to speech recognition results of the first speech recognition result set with recognition score from the first speech recognition result set with recognition score, by using the normalized knowledge information word DF value database, and generate a fourth speech recognition result set with DF similarity degree score, the fourth speech recognition result set with DF similarity degree score being a set of speech recognition results with DF similarity degree score, the speech recognition results with DF similarity degree score being obtained by imparting a DF similarity degree score to the speech recognition results, and generate the second speech recognition result set with integrated score from the first speech recognition result set with recognition score, the third speech recognition result set with vector similarity degree score, and the fourth speech recognition result set with DF similarity degree score.

3. A speech recognition results re-ranking device comprising:

processing circuitry configured to generate a first speech recognition result set with recognition score from speech data, the first speech recognition result set with recognition score being a set of speech recognition results with recognition score, the speech recognition results with recognition score being obtained by imparting a recognition score to speech recognition results; and generate a second speech recognition result set with integrated score from the first speech recognition result set with recognition score, the second speech recognition result set with integrated score being a set of speech recognition results with integrated score, the speech recognition results with integrated score being obtained by imparting the integrated score to the speech recognition results of the first speech recognition result set with the recognition score, by using a word vector expression database and a cluster center vector expression database, wherein text data including a word related to intended use of speech recognition is defined as a knowledge information document, and a set whose element is the knowledge information document is defined as a knowledge information document set, the word vector expression database is composed of records which include a word included in a knowledge-relevant information text set and a word vector corresponding to the word, and the cluster center vector expression database is composed of records which include a cluster center vector which is a center vector of each cluster generated by performing clustering with respect to a knowledge information document text vector set, the knowledge information document text vector set being a set of knowledge information document text vectors, the knowledge information document text vectors being generated from the knowledge information document by using the word vector expression database.

4. The speech recognition results re-ranking device according to claim 3, wherein the processing circuitry is further configured to calculate a vector similarity degree score with respect to speech recognition results of the first speech recognition result set with recognition score from the first speech recognition result set with recognition score, by using the word vector expression database and the cluster center vector expression database, and generate a third speech recognition result set with vector similarity degree score, the third speech recognition result set with vector similarity degree score being a set of speech recognition results with vector similarity degree score, the speech recognition results with vector similarity degree score being obtained by imparting a vector similarity degree score to the speech recognition results, and generate the second speech recognition result set with integrated score from the first speech recognition result set with recognition score and the third speech recognition result set with vector similarity degree score.

5. A speech recognition results re-ranking method comprising:

a speech recognition step in which a speech recognition results re-ranking device generates a first speech recognition result set with recognition score from speech data, the first speech recognition result set with recognition score being a set of speech recognition results with recognition score, the speech recognition results with recognition score being obtained by imparting a recognition score to speech recognition results; and a re-ranking step in which the speech recognition results re-ranking device generates a second speech recognition result set with integrated score from the first speech recognition result set with recognition score, the second speech recognition result set with integrated score being a set of speech recognition results with integrated score, the speech recognition results with integrated score being obtained by imparting an integrated score to speech recognition results of the first speech recognition result set with recognition score, by using a word vector expression database, a cluster center vector expression database, and a normalized knowledge information word DF value database, wherein text data including a word related to intended use of speech recognition is defined as a knowledge information document, and a set whose element is the knowledge information document is defined as a knowledge information document set, the word vector expression database is composed of records which include a word included in a knowledge-relevant information text set and a word vector corresponding to the word the cluster center vector expression database is composed of records which include a cluster center vector which is a center vector of each cluster generated by performing clustering with respect to a knowledge information document text vector set, the knowledge information document text vector set being a set of knowledge information document text vectors, the knowledge information document text vectors being generated from the knowledge information document by using the word vector expression database, and the normalized knowledge information word DF value database is composed of records which include a word, the word being included in the knowledge information document set, and a normalized knowledge information word DF value which is obtained by normalizing a DF value with respect to the knowledge information document set, the DF value being a number of knowledge information documents in which the word appears.

6. A speech recognition results re-ranking method comprising:

a speech recognition step in which a speech recognition results re-ranking device generates a first speech recognition result set with recognition score from speech data, the first speech recognition result set with recognition score being a set of speech recognition results with recognition score, the speech recognition results with recognition score being obtained by imparting a recognition score to speech recognition results; and a re-ranking step in which the speech recognition results re-ranking device generates a second speech recognition result set with integrated score from the first speech recognition result set with recognition score, the speech recognition result set with integrated score being a set of speech recognition results with integrated score, the speech recognition results with integrated score being obtained by imparting an integrated score to speech recognition results of the speech recognition result set with recognition score, by using a word vector expression database and a cluster center vector expression database, wherein text data including a word related to intended use of speech recognition is defined as a knowledge information document, and a set whose element is the knowledge information document is defined as a knowledge information document set, the word vector expression database is composed of records which include a word included in a knowledge-relevant information text set and a word vector corresponding to the word, and the cluster center vector expression database is composed of records which include a cluster center vector which is a center vector of each cluster generated by performing clustering with respect to a knowledge information document text vector set, the knowledge information document text vector set being a set of knowledge information document text vectors, the knowledge information document text vectors being generated from the knowledge information document by using the word vector expression database.

7. A non-transitory computer-readable recording medium storing a program for making a computer function as the speech recognition results re-ranking device according to any one of claims 1 to 4.

\* \* \* \* \*